United States Patent [19]
Weller

[11] Patent Number: 5,345,847
[45] Date of Patent: Sep. 13, 1994

[54] APPARATUS FOR GUIDING ROD-SHAPED WORKPIECES IN TURNING MACHINES

[75] Inventor: Hans-Michael Weller, Marbach, Fed. Rep. of Germany

[73] Assignee: Hainbuch Praezisions-Spannwerkzeugfabrik GmbH, Marbach, Fed. Rep. of Germany

[21] Appl. No.: 60,502

[22] Filed: May 12, 1993

Related U.S. Application Data

[63] Continuation of Ser. No. 834,549, filed as PCT/EP90/01301, Aug. 8, 1990, published as WO 91/02613, Mar. 7, 1991, abandoned.

[30] Foreign Application Priority Data

Aug. 14, 1989 [DE] Fed. Rep. of Germany ....... 3926841

[51] Int. Cl.⁵ .................. B23B 13/00; B23B 13/08
[52] U.S. Cl. .......................................... 82/127; 414/14
[58] Field of Search ................ 82/124, 125, 126, 127; 414/14, 15, 16, 17, 18

[56] References Cited

U.S. PATENT DOCUMENTS

| | | | |
|---|---|---|---|
| 3,696,696 | 10/1972 | Bechler | 82/127 |
| 3,875,830 | 4/1975 | Lechot | 82/126 |
| 3,890,860 | 6/1975 | Gordon | 82/38 |
| 3,941,256 | 3/1976 | Doe et al. | 214/1.4 |
| 4,061,061 | 12/1977 | Lahm et al. | 82/127 |
| 4,088,230 | 5/1978 | Doe et al. | 82/126 |
| 4,221,141 | 9/1980 | Oliver | 82/127 |
| 4,406,190 | 9/1983 | Mason | 82/126 |
| 4,423,651 | 1/1984 | Hardee | 414/18 |
| 4,577,536 | 3/1986 | Lechot et al. | 82/2.7 |
| 4,624,612 | 11/1986 | Geiser et al. | 414/18 |
| 4,649,779 | 3/1987 | Jullerat | 82/2.7 |
| 4,672,869 | 6/1987 | Hasslauer | 414/17 |
| 4,679,470 | 7/1987 | Geiser et al. | 82/2.7 |
| 4,889,024 | 12/1989 | Geiser et al. | 82/126 |

FOREIGN PATENT DOCUMENTS

| | | | |
|---|---|---|---|
| 108182 | 5/1984 | European Pat. Off. | |
| 121638 | 10/1984 | European Pat. Off. | |
| 142232 | 5/1985 | European Pat. Off. | |
| 180686 | 5/1986 | European Pat. Off. | |
| 371373 | 6/1990 | European Pat. Off. | |
| 897037 | 11/1953 | Fed. Rep. of Germany | 82/124 |
| 3409345 | 9/1984 | Fed. Rep. of Germany | |
| 1175542 | 3/1959 | France | 82/124 |
| 38801 | 2/1986 | Japan | 82/124 |
| 641073 | 2/1984 | Switzerland | |

Primary Examiner—William E. Terrell
Attorney, Agent, or Firm—Evenson, McKeown, Edwards & Lenahan

[57] ABSTRACT

The guiding apparatus (10) is disposed between the feed tube (13) of the turning machine and the guide tube (11) for the rod-shaped workpieces which is aligned therewith. The guiding apparatus (10) has an intermediate tube (12) which reaches from the rear end of the feed tube (13) at least to the guide tube (11). Between the feed tube (12) and the intermediate tube (12) a coupling device (14) is present by means of which the intermediate tube (12) is mounted on the feed tube rotatably and axially undisplaceably. The coupling device (14) is sealed from the outside. Between the guide tube (11) and the intermediate tube (12) a seal (42) with axial displacement possibility is present.

5 Claims, 2 Drawing Sheets

APPARATUS FOR GUIDING ROD-SHAPED WORKPIECES IN TURNING MACHINES

This application is a continuation of application Ser. No. 07/834,549, filed as PCT/EP90/01301, Aug. 8, 1990, published as WO 91/02613, Mar. 7, 1991, abandoned.

In single-spindle and multiple-spindle turning machines the rod-shaped workpieces are fed each through a guiding tube at the rear of the particular working spindle of the turning machine. There they are inserted into a feed tube which is disposed within the work spindle and rotates with the latter. At the front end of the feed tube there is a feed collet chuck which, in a cyclic forward movement of the feed tube pushes the rod-shaped workpiece into the collet chuck of the turning machine. Unlike the feed tube the guide tube remains still. Consequently the guide tube is separate from the work spindle and its feed tube.

Since the rod-shaped workpieces also rotate during a work cycle of the turning machine, a relative rotational movement prevails between the workpiece and the guide tube. Since the rear end of the workpiece rotates freely in the guide tube, the workpiece can be in contact with the inside wall of the guide tube. There an unavoidable wear takes place, both on the workpiece and on the guide tube. In order to protect especially the guide tube against great wear, it is known to introduce into the guide tube a liquid by which a hydrodynamic bearing effect is produced between the workpiece and the guide tube during the rotational movement of the workpiece. This bearing effect, however, diminishes toward the front end of the guide tube and at its front end it is virtually zero, because there the lubricant and coolant liquid escapes freely into the interstice between the guide tube and the turning machine. The workpiece is no longer guided in this part of its length.

The lubricant and coolant issuing at the front end of the guide tube often also gets into parts of the turning machine and their operation can be impaired by this liquid. Furthermore, it may be that on the back of the turning machine an at least partially open lubricant circuit is present for the machine parts there, and this lubricant must not be mixed with the liquid from the guide tube. If that is the case, to prevent this the liquid from the guide tube must be carried away by additional measures, such as splash hoods and the like. This calls for additional expense in construction and often creates design difficulties as well.

The invention presented in claim 1 and in claim 2 is addressed to the problem of creating a guiding apparatus for rod-shaped workpieces of turning machines, in which the free escape of the lubricant and coolant from the guide tube at the transition to the turning machine is prevented.

The intermediate tube which is tightly connected at one end to the feed tube of the turning machine and at the other end to the guide tube provides such that the lubricant and coolant liquid which is fed to the guide tube in its initial portion is carried all the way into the feed tube and, in the latter, as far as the collet chuck in the work spindle.

If the same coolant liquid is used as lubricant and as coolant in the guide tube as is used for cooling the cutting tools of the turning machine, then all that is needed is one lubricant and coolant circuit. For this purpose only the feed collet chuck at the front end of the feed tube and the collet chuck in the working spindle of the turning machine have to be set up for the passage of the lubricant and coolant. This is usually accomplished by the conventional construction of these parts. Since the lubricant and coolant liquid flows through the working spindle in a steady stream, a flushing action is simultaneously achieved, which prevents foreign bodies, especially chips, from getting into the working spindle and sticking there. This prevents, for example, the surface of the workpieces from being scratched or damaged, or interference with the holding of the workpiece. In the change of workpiece, in which the collet chuck opens and thus releases a larger passage cross section, the constant flow of liquid also prevents the penetration of foreign bodies into the open collet chuck. The steady flow of flushing liquid also causes such foreign bodies or dirt particles which enter, say, from the rear end of the feed tube or guide tube or are removed from the workpieces by the feed collet chuck or take the form of detritus scraped from the workpiece by the operation of the feed collet chuck, to be flushed out through the outlet openings in the feed collet chuck and in the headstock collet chuck. Additional cooling of the working spindles is achieved by the steady stream of coolant and lubricant, which occurs as a comparatively heavy flow. This is of great importance especially in the case of working spindles of high rotational speed and/or with close bearing clearances, because in this manner the bearing clearance can be kept smaller from the beginning, and does not vary substantially even during the operation of the turning machine.

The use of the intermediate tube has also the additional advantage that, in the case of the use of chuck tubes in the guide tube, the chuck tube in question can be extended all the way into the intermediate tube and even into the feed tube. Thus the workpiece is guided all the way to a point close to the feed collet chuck. The stationary chuck tube in turn is guided and supported in the revolving feed tube by the hydrodynamic bearing effect of the lubricant.

In the embodiment according to claim 1, in which the intermediate tube as well as the guide tube are stationary, the hydrodynamic bearing effect of the lubricant between the guide tube and the workpiece does not diminish right at the front end of the guide tube, but continues beyond the end of the guide tube to the point where it is coupled with the feed tube.

In an embodiment of the guide apparatus according to claim 3, a better separation is achieved between the rotating feed tube and the stationary intermediate tube. In this manner the gasket between the guide tube and the intermediate tube is relieved of any arbitrary relative rotary movements. It can therefore be designed like a rod gasket with purely axial relative movement.

In an embodiment of the guiding apparatus according to claim 4, dirt particles are prevented from penetrating into the gasket and possibly shortening the life of the gasket.

In a guiding apparatus configured according to claim 5, the housing can be designed relatively simply according to the concerns of the gasket, without having to machine the guide tube generally already present, to accommodate the gasket. In this manner the possibilities for the configuration of the gasket and for the parts that accommodate it are broader. The coupling housing can be screwed in a simple manner into the thread which is usually present anyway at the rear end of the guide tube. Thus it is also possible to insert a simple sealing ring at the transition and thereby seal off the transition.

The invention will be further explained below with the aid of two embodiments represented in the drawing, wherein.

Figure 1:
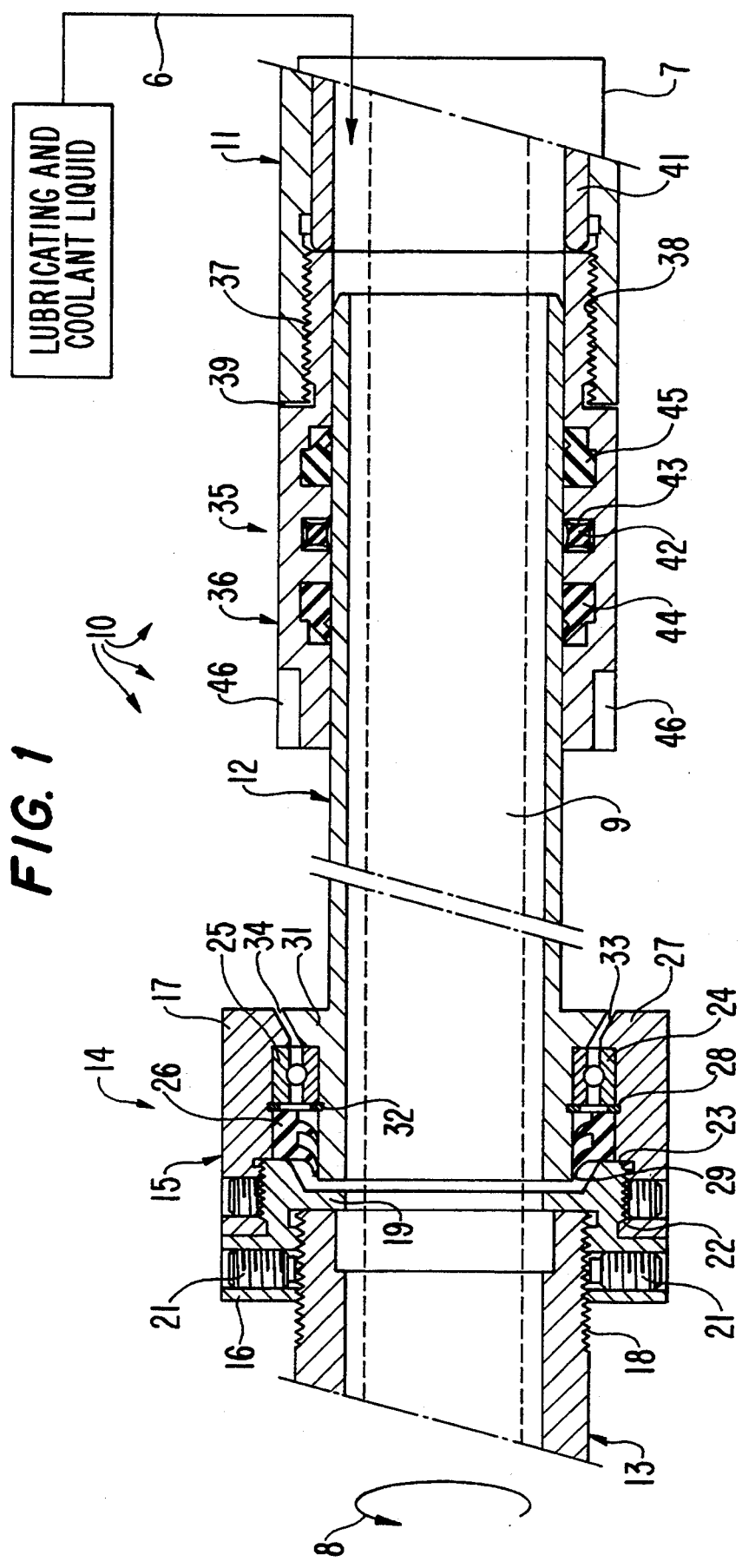
FIG. 1 is a longitudinal section through a first embodiment of the guiding apparatus, with an intermediate tube.

The guiding apparatus 10 seen in FIG. 1 has a guide tube 11 and an intermediate tube 12, both of which are disposed in alignment with the feed tube 13 of a turning machine which is not shown. Means for closing the end of the guide tube remote from the intermediate tube are shown schematically by reference numeral 7. Means for its introducing lubricating and coolant liquid into the guide tube are shown schematically by reference numeral 6. The rotation of the feed tube 13 is shown schematically by arrow 8.

The intermediate tube 12 is journaled on the rear end of the feed tube 13 at its end adjacent the feed tube 13 by means of a coupling device 14, and is coupled in an axially undisplaceable manner with the feed tube 13. For this purpose the coupling device 14 has an approximately tubular coupling housing 15. It is bipartite in construction and has the two housing parts 16 and 17.

The first housing part 16 is provided with an internal screw thread which is matched with the external thread 18 on the rear end of the feed tube 13. The housing part 16 has an inner flange 19 which is in contact with the end face of the feed tube 13 when the housing part 16 is screwed on. After it is screwed on, the housing part 16 is secured by means of two set screws 21 which are each threaded into a radially aligned threaded bore in the housing part and are arranged diametrically to prevent imbalances. The housing part 16 is stepped cylindrically in the longitudinal section of its flange 19 and provided with an external thread 22 which forms a part of the screw assembly of the two housing parts 16 and 17.

On the inside of the second housing part 17 there are two differently configured longitudinal portions. The longitudinal portion adjacent the first housing part 16 is provided with an internal thread 23 which is matched to the external thread 22 on the first housing part 16. The second longitudinal portion of the inner side is in the form of a smooth cylindrical surface 24. It serves for the accommodation of a rolling bearing 25 and an annular seal 26. To secure the position of the rolling bearing 25, an internal flange 27 is present and on the other side a lock ring 28 is disposed which is inserted in a matching groove in the cylindrical surface 24.

As an additional part of the coupling device 14 there is present on the intermediate tube 12 a smooth cylindrical surface 29 whose outside diameter is matched to the inside diameter of the rolling bearing 25 and of the annular seal 26. Here, again, to secure the position of the rolling bearing 25 an external flange 31 is present on the one side, and on the other a lock ring 32 which is inserted into a matching groove in the cylindrical surface 29.

On the inside circumferential surface of the internal flange 27 on housing part 17, there is formed at least the surface section 33 facing outwardly in the axial direction as the circumferential surface of a truncated cone flaring outwardly. Since the coupling housing 15 rotates at a relatively high speed during a working cycle of the turning machine, a considerable centrifugal effect develops on surface section 33, which flings outwardly any dirt particles which enter from the outside into the clearance between the inner flange 27 and the outer flange 31. To further guard against the penetration of dirt particles, the circumferential surface 34 of the external flange 31 is also configured as the circumferential surface of a truncated cone which is matched to surface section 33. This considerably reduces the width of the gap.

At the transition from the intermediate tube 12 to the guide tube 11 a slide bearing 35 is present. It is undisplaceable on and co-rotational with the front end of the guide tube 11. In the slide bearing 35 the rear end section of the intermediate tube 12 remote from the coupling device 14 is guided for longitudinal displacement.

The slide bearing 35 has a tubular housing 36. At its rear end adjacent the guide tube 11 the housing 36 is stepped and provided with an external thread 37 which is matched to the internal thread 38 which is usually present on the front end of the guide tube 11. Into this internal thread 38 the housing 36 is screwed so tightly, in place of the otherwise present holding thimble, that the housing 36 is joined to the guide tube 11 so as to rotate with it due to the thread friction and is undisplaceable in the axial direction thereon due to the screw threads. A gasket 39 seals the junction from the exterior. The housing 36 thus secures a collet chuck tube 41 disposed in the guide tube 11 against being pushed out of the guide tube by the workpieces pushed through the guide tube inside of the collet chuck tube 41, which otherwise is the purpose of the thimble.

The inside diameter of the housing 36 is so coordinated with the outside diameter of the intermediate tube 12 that a sliding fit results. To prevent the coolant and lubricant fluid from escaping out of the guide tube 11 through this annular clearance, an annular seal 42 is present in the housing 36, which is inserted into a circumferential groove 43 in the inner wall of the housing 36. Since the relative movement between the guide tube 11 and the intermediate tube 12 is a simple axial displacement, the annular seal 42 is constructed in the manner of a rod seal.

To extend the life of the annular seal 42, annular dirt strippers 44 and 45 are placed one in front of and the other behind the seal 42, and they are inserted into a circumferential groove matched to their cross-sectional shape on the inside of the housing 36 such that their stripping lip is facing away from the annular seal 42.

To enable the housing 36 to be screwed tightly to the guide tube 11, two or four grooves 46 can be provided on its front end, which can be engaged by spanners in the manner of slotted nuts.

The intermediate tube 12 is made so long that it can span the axial space between the feed tube 13 and the guide tube 11 when the feed tube 13 is in its foremost position. The clear axial distance between the coupling device 14 on the front end of the intermediate tube 12 and the slide bearing 35 on the front end of the guiding tube 12 must be made so great that the intermediate tube 12 can be pushed by the feed tube 13 over its maximum feed distance rearwardly into the guide tube 11 without having the coupling device 14 and the slide bearing 35 collide with one another. If necessary the guide tube 11 must be shifted rearwardly to create the necessary length of movement.

The guide tube 11 of the guiding apparatus 10 has a comparatively large passageway. Even those rod-shaped workpieces 9 can be accommodated therein whose diameter is smaller than the greatest passage width of the guide tube 11. In case of necessity, for the trouble-free guidance of such thinner workpieces into the guide tube 11, a collet chuck tube 41 is used which has an inside diameter to match the outside diameter of the workpieces in question. In turning machines in which the size of the passage of the main spindle and of the feed tube does not exceed a particular dimension-in which, therefore, only workpieces of comparatively small outside diameter are worked-the guide tubes also have only a relatively small size of passage. In that case, generally, no collet chuck tube is used.

Figure 2:
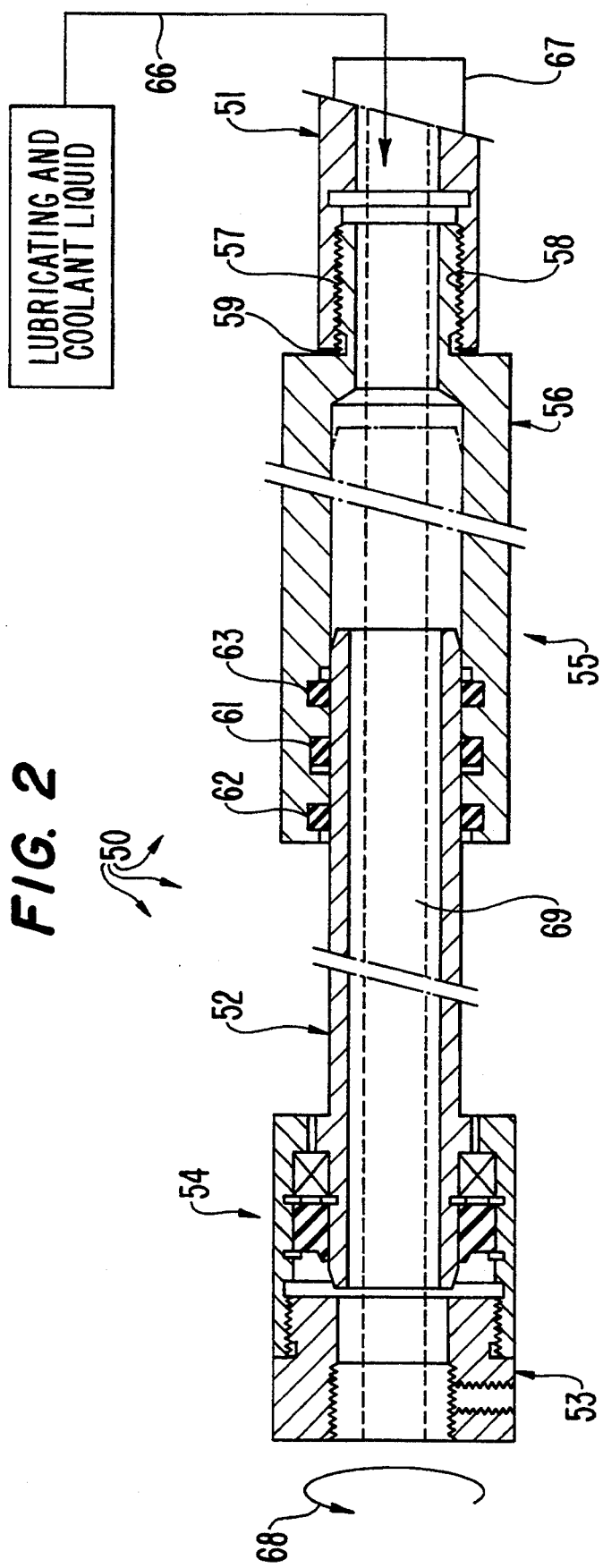
FIG. 2 is a longitudinal section through a second embodiment of the guide tube with an intermediate tube.

In the guiding apparatus 50 seen in FIG. 2, the guide tube 51 has a comparatively small diameter. Accordingly, the intermediate tube 52 and the feed tube 53 of the turning machine likewise have but a comparatively small diameter. Means for closing the end of the guide tube remote from the intermediate tube are shown schematically by reference numeral 67. Means for introducing lubricating and coolant liquid into the guide tube are shown schematically by reference numeral 66. The rod-shaped workpiece is illustrated schematically by reference numeral 69. The rotation of feed tube 52 is illustrated schematically by arrow 68.

The coupling device 54 between the feed tube 53 and the intermediate tube 52 is largely constructed the same as the coupling device 14, aside from the smaller diameters. In the slide bearing 55 the housing 56 is slightly different than the housing 36 in that it is more greatly stepped to enable its external thread 57 to fit into the smaller internal thread 58 at the end of the guide tube 51. Here again an annular seal 59 is inserted. Otherwise, the housing 56 has a sufficiently great outside diameter for the annular seal 61 and the two dirt strippers 62 and 63 to be used in a standard size.

The guiding apparatus between the guide tube of the workpiece guide and the feed tube of the turning machine can also differ more greatly from the two embodiments represented. In the case of the modified embodiment not represented, the intermediate tube with its coupling device is not only axially undisplaceable, but it is also joined to the feed tube of the turning machine so as to rotate therewith. This coupling device then has no rolling bearings but only a seal at rest between the two parts. In this modified embodiment, a slide bearing with a tubular housing is again joined for co-rotation in an axially undisplaceable manner to the front end of the guide tube. Since then the intermediate tube is axially shifted with respect to the slide bearing only in the workpiece feeding phase, but also rotates within the slide bearing during the machining phase of the turning machine, doing so at the rotatory speed of the working spindle, the annular seal and the two dirt strippers must be configured or so selected that they withstand the various relative movements, even if they occur successively in alternation.

I claim:

1. An apparatus for guiding a rod-shaped workpiece to a machine tool workstation, said apparatus comprising:
   a rotatable and axially reciprocable feed tube for feeding said rod-shaped workpiece to said machine tool workstation;
   a guide tube axially aligned with said feed tube for guiding said rod-shaped workpiece, said guide tube being axially spaced from said feed tube;
   means for introducing a lubricating and coolant liquid into said guide tube;
   an intermediate tube spanning between said feed tube and said guide tube, said intermediate tube being axially aligned with said feed tube and said guide tube;
   a first coupling for connecting a first end of said intermediate tube to an adjacent end of said feed tube such that said intermediate tube is axially fixed to said feed tube for reciprocation therewith and such that said intermediate tube is journaled to said feed tube so that said feed tube can rotate relative to said intermediate tube;
   a first annular seal associated with said first coupling for preventing egress of said lubricating and coolant liquid from between said feed tube and said intermediate tube;
   a second coupling for connecting a second end of said intermediate tube to an adjacent end of said guide tube, said second end of said intermediate tube being telescopingly received in said second coupling; and
   a second annular seal associated with said second coupling for preventing egress of said lubricating and coolant liquid from between said guide tube and said intermediate tube.

2. An apparatus according to claim 1, wherein said first coupling is fixedly attached to said feed tube, and a roller bearing is interposed between said first coupling and said intermediate tube.

3. An apparatus according to claim 1, further comprising a dirt stripper interposed between the telescopingly received end of said intermediate tube and said second coupling for stripping dirt from the telescopingly received end of said intermediate tube.

4. An apparatus according to claim 3, wherein said dirt stripper comprises a first stripping element arranged in said second coupling between said second annular seal and said guide tube and a second stripping element arranged in said second coupling on an opposite side of said second annular seal from said guide tube.

5. An apparatus according to claim 1, wherein said second coupling comprises an annular housing fixed to said guide tube, and a third seal is interposed between said housing and said guide tube for preventing egress of said lubricating and coolant liquid from between said guide tube and said housing.

* * * * *